United States Patent [19]

Watanabe et al.

[11] Patent Number: 4,745,509
[45] Date of Patent: May 17, 1988

[54] MAGNETIC HEAD WITH IMPROVED SUPPORTER FOR PERPENDICULAR MAGNETIZATION RECORDING

[75] Inventors: Yoshio Watanabe, Yokohama; Yasuhiko Nakayama; Nobuaki Furuya, both of Kawasaki; Hiroshi Miyama, Yokohama, all of Japan

[73] Assignee: Matsushita Electric Industrial Company, Limited, Japan

[21] Appl. No.: 409,895

[22] Filed: Aug. 20, 1982

[30] Foreign Application Priority Data

Aug. 21, 1981 [JP] Japan ................................ 56-131958
Aug. 21, 1981 [JP] Japan ................................ 56-131952
Aug. 21, 1981 [JP] Japan ................................ 56-131955
Aug. 21, 1981 [JP] Japan ................................ 56-131957
Feb. 12, 1982 [JP] Japan ................................ 57-21411
Jul. 23, 1982 [JP] Japan ................................ 57-129336

[51] Int. Cl.⁴ .................... G11B 5/127; G11B 5/187
[52] U.S. Cl. ........................... 360/125; 360/122; 360/127; 360/110
[58] Field of Search ............ 360/122, 125, 127, 128, 360/129, 110, 113, 111, 120, 119, 123

[56] References Cited

U.S. PATENT DOCUMENTS

| | | | |
|---|---|---|---|
| 2,549,771 | 4/1951 | Camras | 360/125 |
| 3,840,898 | 10/1974 | Bajovek et al. | 360/125 |
| 3,860,965 | 1/1975 | Voegeli | 360/113 |
| 3,921,217 | 11/1975 | Thompson | 360/113 |
| 3,947,889 | 3/1976 | Lazzari | 360/125 |
| 4,036,723 | 7/1977 | Schwartz et al. | 360/113 |
| 4,044,392 | 8/1977 | Brock et al. | 360/113 |
| 4,052,749 | 10/1977 | Nomura | 360/123 |
| 4,107,751 | 8/1978 | Shimoda | 360/122 |
| 4,179,719 | 12/1979 | Inamura et al. | 360/122 |
| 4,210,946 | 7/1980 | Iwasaki et al. | 360/131 |
| 4,214,287 | 7/1980 | Stromasta et al. | 360/122 |
| 4,222,084 | 9/1980 | Nakagawa et al. | 360/122 |
| 4,225,892 | 9/1980 | Bassett et al. | 360/125 |
| 4,246,620 | 1/1981 | Kaminaka et al. | 360/121 |
| 4,251,841 | 2/1981 | Jacobs | 360/122 |
| 4,298,899 | 11/1981 | Argumedo et al. | 360/122 |
| 4,383,284 | 5/1983 | Isshiki | 360/125 |
| 4,405,960 | 9/1983 | Pick et al. | 360/126 |
| 4,517,616 | 5/1985 | Biscloff | 360/126 X |
| 4,571,653 | 2/1986 | Suzuki et al. | 360/121 |
| 4,575,777 | 3/1986 | Hosokawa | 360/123 X |

FOREIGN PATENT DOCUMENTS

| | | | |
|---|---|---|---|
| 2344561 | 4/1975 | Fed. Rep. of Germany . | |
| 2907806 | 1/1980 | Fed. Rep. of Germany . | |
| 54-32311 | 9/1979 | Japan | 360/122 |
| 0554733 | 1/1980 | Japan | 360/122 |
| 0554737 | 1/1980 | Japan | 360/127 |
| 55-1625 | 1/1980 | Japan | 360/125 |
| 55-70926 | 5/1980 | Japan | 360/122 |
| 55-105818 | 8/1980 | Japan | 360/122 |
| 55-113122 | 9/1980 | Japan | 360/125 |
| 0545417 | 1/1981 | Japan | 360/125 |
| 56-25218 | 3/1981 | Japan | 360/122 |
| 56-41522 | 4/1981 | Japan | 360/122 |
| 56-87216 | 7/1981 | Japan | 360/125 |
| 56-87219 | 7/1981 | Japan | 360/125 |
| 56-87217 | 7/1981 | Japan | 360/125 |
| 56-93111 | 7/1981 | Japan | 360/122 |

OTHER PUBLICATIONS

IBM Technical Disclosure Bulletin, vol. 13, No. 1, Jun. 1970, pp. 248–249, "Thin Film Magnetic Head".

*Primary Examiner*—John H. Wolff
*Assistant Examiner*—Alfonso Garcia
*Attorney, Agent, or Firm*—Lowe, Price, LeBlanc, Becker & Shur

[57] ABSTRACT

In a magnetic head of perpendicular magnetization type having main and sub magnetic poles arranged at both sides of a recording medium, a nonmagnetic supporter holding a high permeability magnetic thin layer of the main magnetic pole is formed by a polycrystalline sintered body substantially composed of titanium carbide and alumina. This polycrystalline sintered product well matches with a recording medium having a cobalt-chromium alloy layer so that the recording medium does not wear for a long time of use, and therefore, so that the contact surface of the main magnetic pole is hardly damaged. The same sintered body may also be used for the sub magnetic pole arranged to be in contact with the recording medium. Some structural improvements are also provided so that undesirable influence due to an adhesive layer adjacent to the magnetic thin layer is removed. One or more additional thin layers may be provided for reducing crosstalk between adjacent tracks. A magnetically shielding block is provided to prevent undesirable influence caused by an external magnetic field.

11 Claims, 12 Drawing Sheets

MAGNETIC HEAD WITH IMPROVED SUPPORTER FOR PERPENDICULAR MAGNETIZATION RECORDING

BACKGROUND OF THE INVENTION

This invention relates generally to magnetic heads for recording and reproducing information or data on and from a magnetic recording medium, such as a magnetic recording tape or the like, and more particularly, the present invention relates to a perpendicular magnetization recording magnetic head with which magnetization is effected in a direction perpendicular to the plane of a magnetic recording medium.

Perpendicular magnetization recording technique has been introduced in order to increase the density of information to be recorded or written on a magnetic recording medium. Such a perpendicular magnetization recording method is disclosed, for instance, in U.S. Pat. No. 4,210,946. In a known technique for effecting perpendicular magnetization with respect to a recording medium, a magnetic head having a main pole and a sub or auxiliary pole is usually employed for magnetizing a small area on a magnetic recording medium such as a recording tape or sheet. The main pole is constructed of a thin magnetic layer or film, made of high permeability material, and a supporter made of a nonmagnetic material in such a manner that the thin magnetic film is sandwiched between a pair of nonmagnetic members constituting the supporter. The sub magnetic pole comprises a magnetic core equipped with one or more coils. The main and sub magnetic poles face each other and are spaced from each other so that a magnetic recording medium can travel through the space therebetween. Namely, the main and sub poles are arranged so that magnetic flux emitted from one end of the sub pole passes through the travelling recording medium to be received by the thin magnetic film of the main pole to constitute a magnetic circuit.

The main magnetic pole of such a perpendicular magnetization recording magnetic head is arranged to be in contact with the magnetic recording medium which moves in a given direction so that a predetermined contact pressure is given to the recording medium. Therefore, the recording medium and the contacting portion of the main pole of the magnetic head is apt to wear due to friction. In order to reduce such friction, it has been proposed hitherto, to use a lubricant in such a manner that a lubricant is mixed with the recording medium so that sliding friction with the head is reduced. According to another known technique for reducing such friction, the sliding surface of the recording medium is smoothed to provide a mirror finished surface. Similarly, for reducing the amount of wearing of the head various materials, such as hot press ferrite, Sendust, single-crystalline ferrite or the like, having a high resistance to wear are used.

The magnetic thin film of the main pole is sandwiched between a pair of nonmagnetic members as described in the above, while these nonmagnetic members of the main pole are made of ceramics, such as barium titanate, having a high resistance to wear so that it does not wear readily. However, such nonmagnetic members made of ceramics, glass, sapphire or the like, are not necessarily satisfactory because they cause damages in recording media. The wear of recording media results in the wear of the main pole in turn due to worn and therefore rough surface of the recording media.

Apart from the above described problem, there is another problem relating to the width of the thin layer of the main magnetic pole. Since the thin layer is interposed between a pair of nonmagnetic members of the supporter, the exposed end of the thin layer which comes into contact with the recording medium is apt to widen in the direction of the movement of the recording medium because the hardness of an adhesive adjacent to the thin layer is not as high as that of the thin layer. In addition, such an adhesive is apt to wear so that edges of nonmagnetic members of the supporter are apt to expose the recording medium to damage.

Furthermore, when making a plurality of tracks on a recording medium by a perpendicular magnetization recording magnetic head, there is a problem of crosstalk between adjacent tracks. To avoid such undesirable crosstalk, therefore, each track has to be spaced apart from adjacent tracks.

Furthermore, because of high pemeability the thin layer of the main magnetic pole of the head is apt to be influenced by an external magnetic field which may be emitted from some other magnetic devices. Such an external magnetic field results in the decrease in the output amplitude of the head.

SUMMARY OF THE INVENTION

The present invention has been developed in order to remove the above-described drawbacks inherent to the conventional perpendicular magnetization recording magnetic head.

It is, therefore, an object of the present invention to provide a new and useful magnetic head for effecting perpendicular magnetization which does not damage a magnetic recording medium used therewith, and which does not wear in a long time use.

Another object of the present invention is to provide a magnetic head for effecting perpendicular magnetization in which the thickness of the thin magnetic layer of the main magnetic pole does not change, while the linearity of the edges of the thin layer can be maintained for a long time.

A further object of the present invention is to provide a magnetic head for effecting perpendicular magnetization in which crosstalk between adjacent tracks is effectively prevented.

A still futher object of the present invention is to provide a magnetic head for effecting perpendicular magnetization in which problems caused by external magnetic field are resolved.

In accordance with the present invention there is primarily provided a magnetic head of perpendicular magnetization type comprising: a main magnetic pole having a thin layer made of high permeability magnetic material, and a nonmagnetic supporter for holding said thin layer, said thin layer and said supporter providing a contact surface arranged to be in contact with a recording medium, at least the contact surface of said supporter being made of a polycrystalline sintered body substantially composed of titanium carbide and alumina; a sub magnetic pole having a core arranged to face said main magnetic pole to constitute a magnetic circuit therewith so that said recording medium travels between said main and sub magnetic poles; and at least one coil arranged to excite one of said main and sub magnetic poles.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing preferred embodiments of the present invention, a conventional perpendicular magnetization recording magnetic head will be discussed for a better understanding of the features of the present invention.

Figure 1:
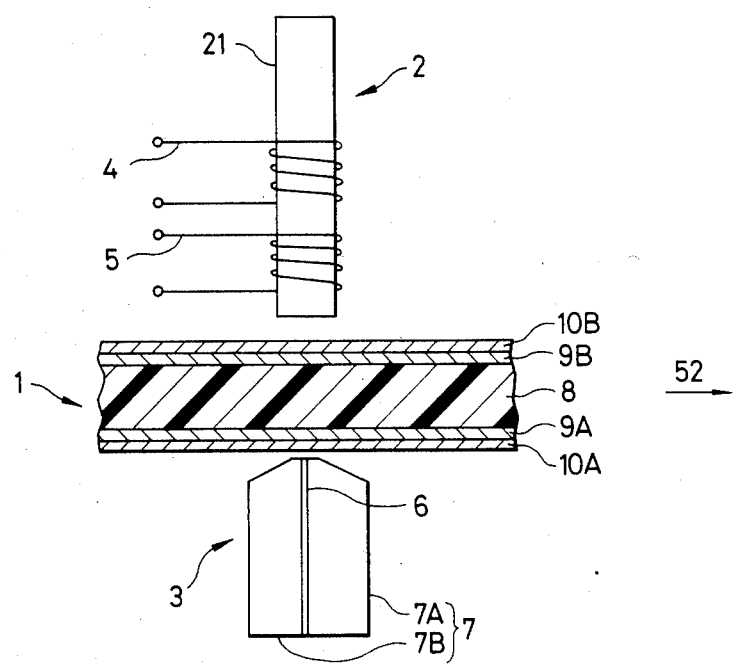
FIG. 1 is a schematic view showing the relationship between a perpendicular magnetization magnetic head and a magnetic recording medium, showing not only a conventional arrangement but also an embodiment of the present invention.

FIG. 1 illustrates the relationship between a perpendicular magnetization magnetic head and a magnetic recording medium shown by way of its cross-section. As will be described later, since a first feature of the present invention is related to the material used in the head, the arrangement of FIG. 1 shows not only a conventional arrangement but also an embodiment of the present invention. The illustrtated recording medium 1 is a magnetic tape or sheet having an easy axis of magnetization perpendicular to its surface. In detail, the recording medium 1 has a nonmagnetic base 8, made of a polyimide film, polyester film or the like, and two kinds of layers 9A, 9B and 10A, 10B made of magnetic materials. Two of the first kind layer 9A and 9B are formed on both sides of the nonmagnetic base 8, and are made of a high permeability material, such as permalloy (an alloy of Fe and Ni), having in-plane anisotropy. Two of the second kind layer 10A, 10B are formed respectively on the first layers 9A, 9B, and are made of a magnetic material, such as a film of alloy of Co and Cr, showing perpendicular anisotropy. These two kinds of layers 9A, 9B and 10A, 10B are respectively formed by sputtering or the like.

The illustrated magnetic head comprises a main magnetic pole 3 and a sub or auxiliary magnetic pole 2 arranged to interpose the recording medium 1 therebetween. The words, "main magnetic pole" are used to mean a portion of the head which faces the recording or writing side or surface of the recording medium 1, while the words, "sub magnetic pole" are used to mean the other portion of the head which faces the nonrecording side of the same. Namely, as will be apparent hereafter, perpendicular magnetization is effected at only one side of the recording medium 1 facing the main magnetic pole 3. Since the magnetic recording medium 1 illustrated in FIG. 1 has two recording layers 10A and 10B to be magnetized in a direction perpendicular to the surfaces of the recording medium 1, the recording medium 1 may be turned upside down to record information on both sides thereof. If another head is provided in addition to the illustrated head in such a manner that a main magnetic pole of the additional head faces the back side, i.e. the top side in FIG. 1, the recording medium 1 is not needed to be turned upside down to record on both sides thereof.

The sub magnetic pole 2 comprises a core 21 made of ferrite or the like and is equipped with two coils 4 and 5 each having 50 to 1000 turns. The first coil 4 is used to excite the head when recording or writing in receipt of electrical signals, and the second coil 5 is to produce electrical signals when reproducing information or data from the recording medium 1. Although two coils 4 and 5 are illustrated, it is possible to provide only a single coil so that it functions as a record/reproduce coil. The core 21 of the sub magnetic pole 2 is arranged to be normal to the surfaces of the recording medium 1 so that perpendicular magnetization will be effected as will be described later.

The main magnetic pole 3 comprises a thin layer 6 made of a high permeability material, such as permalloy, and a supporter 7 made of a nonmagnetic material. The magnetic thin layer 6 is interposed or sandwiched between a pair of nonmagnetic members 7A and 7B constituting the supporter 7, and is arranged to be perpendicular to the surfaces of the recording medium 1 in alignment with the longitudinal axis of the core 21 of the sub magnetic pole 2 so that the main and sub poles 3 and 2 face each other through the recording medium 1. The magnetic thin layer 6 is of 0.1 to 3 micrometers thick, and is sandwiched between the pair of nonmagnetic members 7A and 7B. In detail, the thin layer is formed on the side surface of one of the nonmagnetic members 7A and 7B by sputtering, vapor deposition, plating or the like, and then the two nonmagnetic members 7A and 7B are assembled by using an adhesive (not shown).

When recording, the record coil 4 of the sub magnetic pole 2 is energized to produce a magnetic field whose flux is emitted from one end of the core 21 and returns to the other end. This magnetic flux penetrates the recording medium 1 so that the magnetic layer 10 adjacent to the main magnetic pole 3 is magnetized in a direction normal or perpendicular to the plane of the recording medium 1, and enters into the thin layer 6 of the main magentic pole 3. Since the thickness of the magnetic thin layer 6 is very small, the flux from the sub magnetic pole 2 is concentrated on a narrow area of the magnetic layer 10A to magnetize only this narrow area. When it is intended to write a binary signal, the record coil 4 of the sub magnetic pole 2 is energized with opposite polarity signals for logic "1" and "0". Thus the direction of magnetization on the magnetic layer 10A is changed in accordance with the logic state of the binary signal. The thin layer 6 of the main magnetic pole 3 has a predetermined length along the surface of the recording medium 1 in a direction normal to the direction of the relative movement so that a track width is defined by the length of the thin layer 6.

On playback or reproduction from the recording medium 1, the thin layer 6 of the main magnetic pole 3 is responsive to magnetic field from the recorded portions on the magnetic layer 10A of the recording medium 1 to produce magnetic flux therein. The magnetic flux induced in the thin layer 6 is then led into the core 21 of the sub magnetic pole 2 so that a reproduced signal can be derived from the reproduce coil 5.

According to a first feature of the present invention, the nonmagnetic members 7A and 7B of the supporter 7 of the main magnetic pole 3 are made of a polycrystalline sintered body substantially composed of alumina ($Al_2O_3$) and titanium carbide (TiC). As such a substance, a sintered body known as SCS-AC1 or SCS-AC2 manufactured by Sumitomo Special Metals Co., Ltd may be used.

Figure 2:
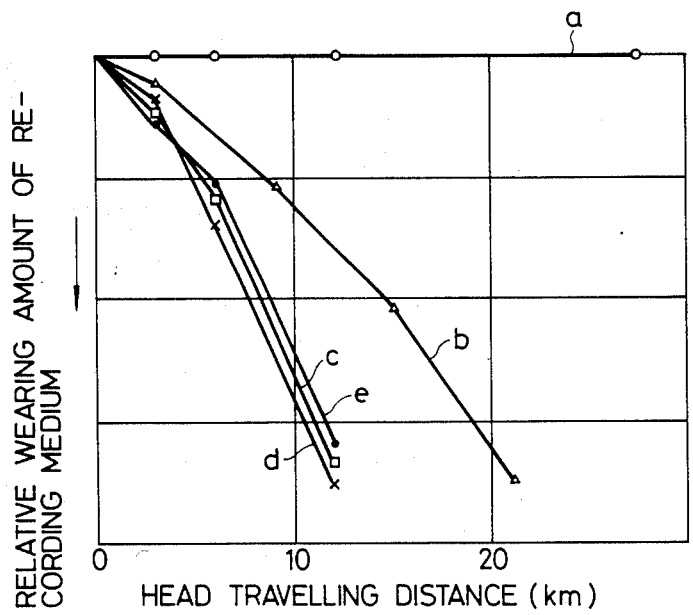
FIG. 2 is a graph showing wearing characteristics of a recording medium.

Inventors of the present invention made experiments on various materials for the nonmagnetic members 7A and 7B of the supporter 7 of the main magnetic pole. 3. In the experiments, a magnetic recording medium 1 having a base made of a polyester film and thin layers of Cobalt-Chromium (Co-Cr) alloy formed on the base by sputtering, was used, and the recording medium 1 was driven so that the relative velocity between the recording medium 1 and the head was 150 cm/sec, while a contact pressure of several grams/mm$^2$ was applied to the main magnetic pole 3 to be in contact with the recording medium 1. FIG. 2 is a graph showing the results of the experiments. Namely, the amount of damage of the magnetic substance layer on the recording medium 1, which damage is caused by the friction with the main magnetic pole 3, is plotted with respect to various substances used for the nonmagnetic members 7A and 7B of the supporter 7. In detail, curves (a) to (e) show respectively the wearing charateristics of the recording medium 1 when various materials are used for the nonmagnetic members 7A and 7B of the supporter 7 as follows:

(a) a sintered body of an alloy of TiC-$Al_2O_3$;
(b) nonmagnetic sintered body of ferrite;
(c) glass;
(d) barium titanate ($BaTiO_3$);
(e) sapphire;

As is apparent from the graph of FIG. 2 when a polycrystalline sintered body of TiC-$Al_2O_3$ is used as the material of the nonmagnetic members 7A and 7B of the supporter 7, the magnetic layer 10A of Co-Cr alloy is hardly damaged even after a long time use. The reasons that the polycrystalline sintered body of TiC-$Al_2O_3$ is superior in connection with damages or wear of the Co-Cr alloy layer, are considered that this sintered body has the following features:

(1) It has a sufficient hardness; Vicker's hardenss is approximately 2000.
(2) It is a polycrystalline.
(3) It is of low porosity.

In the above it is to be noted that when paying attention to only the hardness, the hardness of sapphire is greater than that of the polycrystalline sintered body of TiC-$Al_2O_3$. However, as will be understood from the graph of FIG. 2, a supporter made of sapphire damages the recording medium 1 more than a supporter made of TiC-$Al_2O_3$. This means that the polycrystalline sintered body of TiC-$Al_2O_3$ well matches with the magnetic recording layer 10A of Co-Cr alloy. In other words, it can be said that polycrystalline sintered body of titanium carbide-alumina (TiC-$Al_2O_3$) is congenial to cobalt-chromium (Co-Cr) alloy layer of the magnetic recording medium 1. Due to this fact that the Co-Cr alloy layer 10A is hardly damaged by the polycrystalline sintered body of TiC-$Al_2O_3$, the suface of the Co-Cr alloy layer 10A is kept smooth for a long time and therefore, the contact surface of the main magnetic pole 3 is difficult to wear.

The following table shows various characteristics of the above-mentioned polycrystalline sintered body of TiC-$Al_2O_3$, namely, SCS-AC1 and SCS-AC2.

TABLE

| PROPERTY | | AC1 | AC2 |
| --- | --- | --- | --- |
| Vicker' Hardness | Hv (500 g) | 2000 | 2000 |
| Bending Strength | δ b (kg/mm$^2$) | 90 | 90 |
| Compressive Strength | δ c (kg/mm$^2$) | 350 | 350 |
| Average Grain Size | (μm) | 6 | 3 |
| Density | D (g/cm$^3$) | 4.24 | 4.25 |
| Porosity | (%) | 0.05 | 0.05 |
| Specific Heat | Cp (Cal/g. °C.) | 0.24 | 0.23 |
| Thermal Conductivity | λ (Cal/cm. g. °C.) | 0.04 | 0.04 |
| Thermal Expansion Coefficient | α (ppm/°C.) | 7.80 | 7.85 |
| Electrical Resistivity | ρ (Ω-cm) | 1.0 | 1.0 |
| Relative Grinding Resistance | AC1 = 100 | 100 | 70 |
| Machinability | Chipping | good | better |
| Friction Coefficient | — | 0.38 | 0.33 |

The mixing ratio of titanium carbide (TiC) and alumina ($Al_2O_3$) may be between 1:9 and 5:5 by weight. In the case of the above-mentioned SCS-AC1, the mixing ratio of the same is 3:7 by weight, and a satisfactory result has been obtained thereby.

In the above embodiment, although it has been described that the nonmagnetic members 7A and 7B of the supporter 7 are made of the above-mentioned polycrystalline sintered body of TiC-Al$_2$O$_3$, it is not required to form the entire of the supporter or body of the main magnetic pole 3 with such a sintered body. Namely, such a sintered body may be used for only a contact portion of the main magnetic pole 3.

Figure 3:
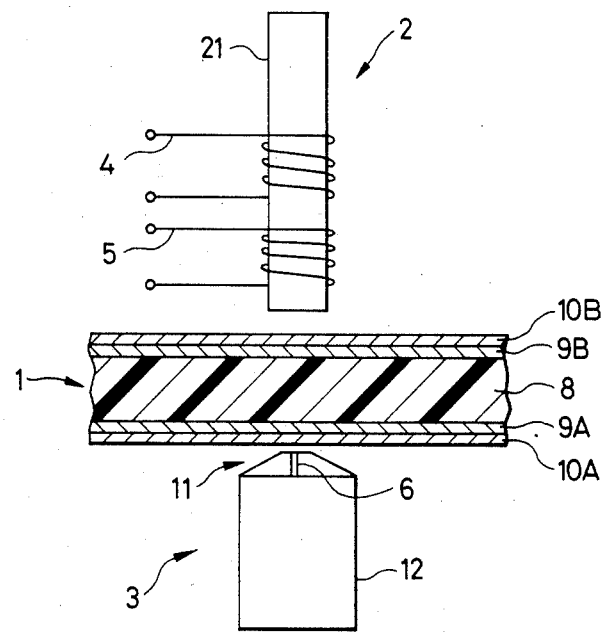
FIG. 3 is schematic view showing a modification of the embodiment of FIG. 1.

Hence, reference is now made to FIG. 3 showing a modification of the above-described embodiment. The magnetic head of FIG. 3 differs from that of FIG. 2 in that TiC-Al$_2$O$_3$ sintered body is used for only the front surface portion 11 of the main magnetic pole. In detail, a pair of pieces of TiC-Al$_2$O$_3$ polycrystalline sintered body holding a thin magnetic layer 6 is attached to a body 12 of the main magnetic pole 3 so that these pieces are in contact with the Co-Cr layer 10A of the recoding medium 1, while the body 12 is made of a nonmagnetic material.

It has been described with reference to FIG. 1, that only the main magnetic pole 3 is in contact with the recording medium 1. Namely, according to the conventional technique, the sub magentic pole 2 is spaced apart from the back surface of the recording medium 1 so that friction between the sub magnetic pole 2 and the recording medium 1 does not occur. However, it is desirable that the sub magnetic pole 2 is disposed as close to the recording medium 1 as possible in view of recording and reproducing efficiency.

Figure 4:
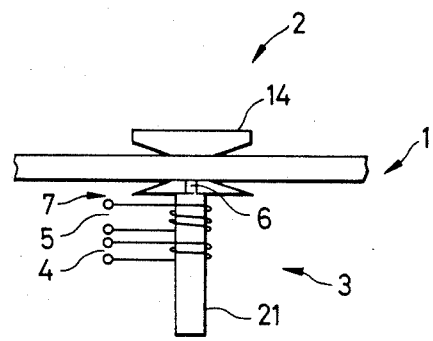
FIG. 4 is schematic view of a magnetic head of a main magnetic pole excitation type.

Apart from the structure of the head of FIG. 1, when a head of the type arranged to excite the main magnetic pole is used as shown in FIG. 4, a magnetic block 14, which is also called a sub or auxiliary magnetic pole 2, is arranged to face the main magnetic pole 3. The magnetic block 14 is made of ferrite and is arrranged to be in contact with the back side of the recording medium 1 so that the magnetic path of the flux of the head can be regarded to be close to a closed magnetic path rather than an open magnetic path because the amount of circulating flux increases compared to the case where no such a block is provided. Furthermore, with the provision of such a mangetic block 14 it is possible to reduce spacing loss caused by unseen space between the main magnetic pole 3 and the recording medium 1 by pressing the magnetic block 14 toward the main magnetic pole 3. From the above it will be understood that it is desirable to adopt an arrangement in which the sub magnetic pole 2 is in contact with the magnetic recording medium 1 and is pressed toward the main magnetic pole 3 with a relatively high pressure for increasing the recording efficiency. However, such an arrangement results in wear and damage of the main and sub magnetic poles 3 and 2 and the recording medium 1. For this reason the sub magnetic pole 2 is positioned to be spaced apart from the recording medium in the conventional arrangement.

Figure 5:
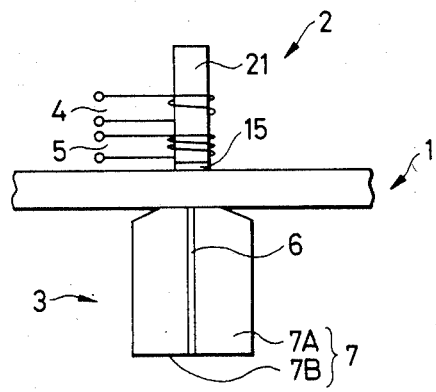
FIG. 5 is a schematic view of an embodiment in which the same material as that used in the supporter of the embodiment of FIG. 1 is used for a contact surface of a sub magnetic pole.

FIG. 5 shows an embodiment in which a polycrystalline sintered body subtantially composed of TiC-Al$_2$O$_3$ is used at one end of the sub magnetic pole 2 of a magnetic head which is substantially the same in construction with that of FIG. 1 except that the sub magnetic pole 2 is in contact with the recording medium 1. A thin layer 15 of TiC-Al$_2$O$_3$ composite material which is subtantially the same as that used for the nonmagnetic members 7A and 7b of the supporter 7, is attached to the end of the core 21 by means of an adhesive, such as epoxy resin, glass adhesive or the like. When manufacturing, a thin layer of TiC-Al$_2$O$_3$ having a thickness of 0.3 to 0.5 mm is attached first, and this thin layer is polished to have a thickness of 0.01 to 0.3 mm, while the surface thereof is smoothed. The reason that the thickness is reduced is that a thick layer of such a material reduces the flux circulating effect because TiC-Al$_2$O$_3$ is a nonmagnetic material.

Figure 6:
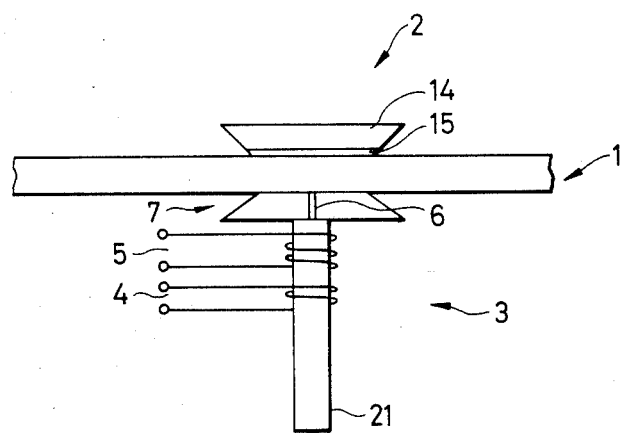
FIG. 6 is a schematic view showing a modification of the embodiment of FIG. 5.

FIG. 6 is an embodiment showing an example that the present invention has been applied to a head of the type that the main magnetic pole 3 is excited. Namely, the head of FIG. 6 differs from that of FIG. 4 in that a thin layer 15 of TiC-Al$_2$O$_3$ is atttached to the surface of the magnetic block 14 or sub magnetic pole 2 which is made of a sintered body of Mn-Zn ferrite or the like. The thickness of the TiC-Al$_2$O$_3$ layer 15 may be reduced in the same manner as described in the above.

Figure 7:
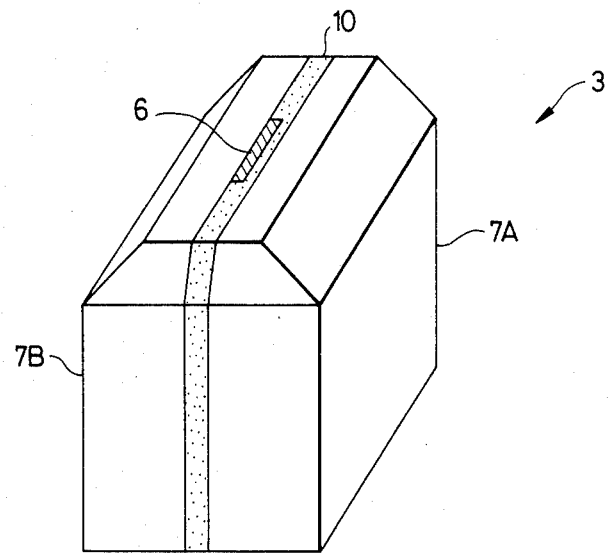
FIGS. 7 and 8 are explanatory diagrams showing conventional main magnetic poles.

In the magnetic head shown in FIG. 1, the thin layer 6 is shown to be directly sandwiched between a pair of nonmagnetic members of the supporter 7. Actually, however, the thin layer 6 is formed on the side surface of the nonmagnetic member 7B by sputtering, vapor deposition or the like so that the thickness thereof is between 0.1 and 3 micrometers. After this, the other nonmagnetic member 7A is assembled as shown in FIG. 7. Namely, in the illustrated conventional example of FIG. 7, the magnetic thin layer 6 is fixedly attached to the left half nonmagnetic member 7B and then the left half 7B is assembled with the right half 7A by an adhesive 10. The front end or edge, i.e the top portion in FIG. 7, of the assembled head is polished to provide a mirror-finished surface which will be contact with the recording medium 1 of FIG. 1 in use. As is well known, since the upper limit of the recording density is detrmined by the thickness of the thin layer 6, this thickness should be accurately set. In addition, the shape of the exposed end of the thin layer 6 should not be changed during manufacturing because deformation of the shape of the exposed end of the thin layer 6 may result in deterioration in the performance.

Figure 8:
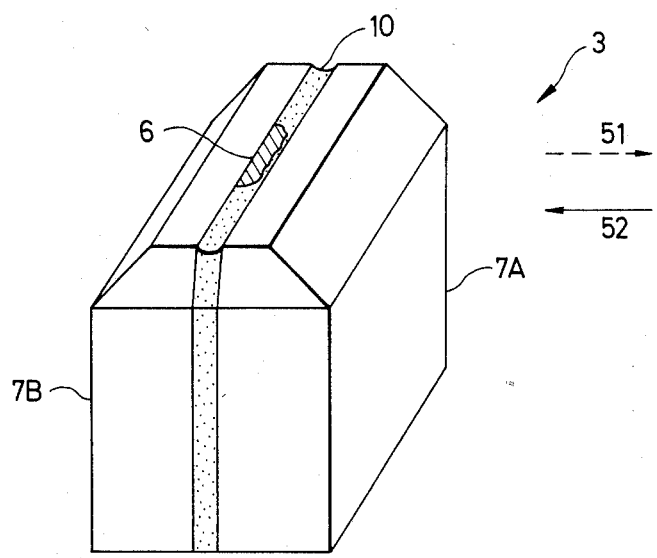

When such a conventional head of FIG. 7 is used for a long time, the adhesive 10 is apt to wear because its hardness is much lower than that of the nonmagnetic members 7A and 7B. As the adhesive layer 10 wears, the exposed end of the thin layer 6 is deformed as shown in FIG. 8. Namely, an edge of the exposed end of the thin layer 6 adjacent to the adhesive layer 10 takes a curved or wavelike shape. Such an undulatory edge of the thin layer 6 of the main magnetic pole 3 results in deterioration in efficiency in recording and reproducing. Moreover, due to such undulatory edge the effective width of the thin layer 6 is regarded as if it has been increased from its original value. This results in the decrease in the upper limit of the recording density per unit length on the recording medium 1.

Figure 9:
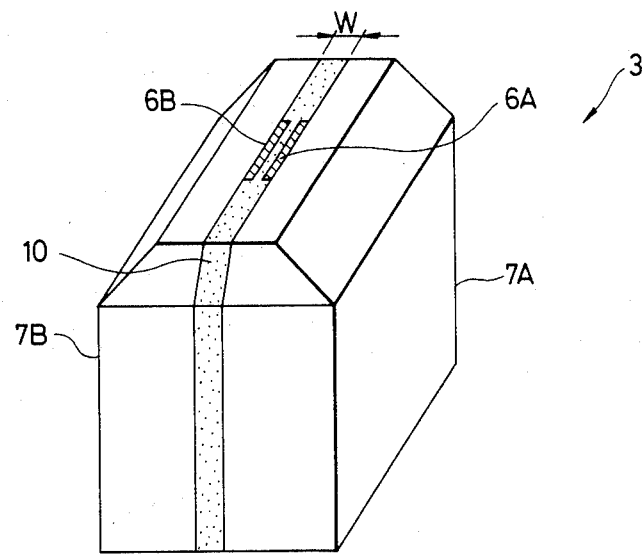
FIG. 9 view showing an embodiment in which a pair of thin layers of high permeability is used.
Figure 10:
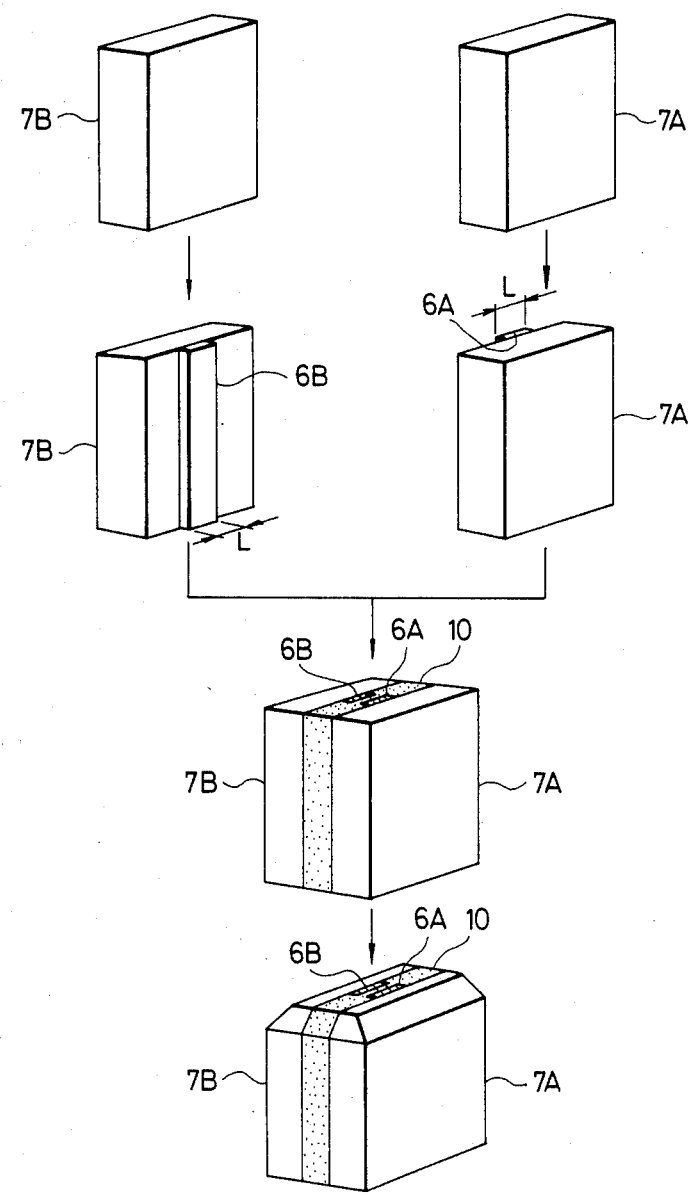
FIG. 10 is a schematic view showing the manufacturing process of the main magnetic pole of FIG. 9.

In order to avoid such undesirable problems inherent to the conventional head, a new structure of the head is provided as shown in FIG. 9. In the embodiment of FIG. 9, a pair of thin layers 6A and 6B is provided in place of a single thin layer 6 of FIG. 7. A first thin layer 6A is attached to the side surface of the left half nonmagnetic member 7A, while a second thin layer 6B is attached to the side surface of the right half nonmagnetic member 7B before these two halves are assembled by using an adhesive 10. FIG. 10 shows the steps of manufacturing the main magnetic pole 3 of FIG. 9.

The effective width of the main magnetic head of FIG. 9 is considered to be equal to the sum of the thicknesses of the pair of thin layers 6A and 6B because the thickness of the adhesive 10 interposed between the pair of thin layers 6A and 6B is smaller than 0.5 micrometers so that it can be ignored. In other words, the effective width is defined by the distance W between the inner sides of the nonmagnetic members 7A and 7B. Each of the thin layers 6A and 6B is fixedly attached to the inner side surface of the nonmagnetic member 7A or 7B, and therefore, the edge of exposed end of the thin layer 6A, 6B adjacent to the nonmagnetic member 7A, 7B is not deformed. Accordingly, the effective width W of the main magnetic pole 3 does not change even if the head is used for a long time. Turning back to FIG. 8 showing the prior art, since the width of the exposed end of the thin layer 6 tends to broaden in a direction of an arrowed dotted line 51, the recording medium 1 of FIG. 1 should move in a direction of an arrowed solid line 52 relative to the head. However, when the head of FIG. 9 is used, the effective width W of the main magnetic pole 3 does not broaden beyond the inner sides of the left and right halves 7A and 7B of the supporter 7. Consequently, the orignal width does not change while the original rectangular shape defined by the outer edges of the pair of thin layers 6A and 6B is kept unchanged.

In the illustration of FIG. 10 showing the manufacturing steps of the head of FIG. 9, the thickness of the thin layer 6A is not necessarily equal to the thickness of the other thin layer 6B. When forming each of the thin layers 6A and 6B on the inner side surface of the nonmagnetic member 7A, 7B, the length L of the thin layer measured along a direction normal to the relative movement direction between the recording medium 1 and the head, is set to a predetermined width of a single track to be made on the recording medium on recording. This length L should be common to both the thin layers 6A and 6B, while the position of the thin layers 6A and 6B should be so selected that they face each other when assembled as shown in FIG. 9. As the adhesive 10, an epoxy resin, low melting point glass or the like may be used. Although it has been described that the thin layers 6A and 6B are formed by sputtering or vapor deposition, photoetching techniques may be used alternatively. When a photoetching technique is used, a thin layer of high permeability is first formed on the entire inner surface of the nonmagnetic member 7A, 7B, and then unnecessary portions of the thin layer will be removed to provide the elongate strip like thin layer 6A, 6B.

Turning back to FIG. 8, the conventional structure of the main magnetic pole 3 has suffered from a problem that the adhesive layer 10 is apt to wear due to friction with the recording medium 1 as described in the above. When the exposed end of the adhesive layer 10 wears so that the front surface thereof is not flat and is not flush with the front surfaces of the nonmagnetic members 7A and 7B, the edges of the nonmagnetic members 7A and 7B adjacent to the adhesive layer 10 are exposed. Since the nonmagnetic members 7A and 7B are both made of a hard material as described in the above, the presence of such edges may result in the damage or wear of the recording medium 1. Moreover, due to the difference in the hardeness between the adhesive layer 10 and the nonmagnetic members 7A and 7B, the exposed end of the adhesive layer 10 is apt to be exessively taken off when polishing the front surface of the main magnetic pole 3 to complete the main magnetic pole 3. These drawbacks are caused by the presence of the adhesive layer 10, and especially by the fact that the thickness of the adhesive layer 10 cannot be made smaller than the thickness of the thin layer 6 with the structure of FIG. 9.

Figure 11:
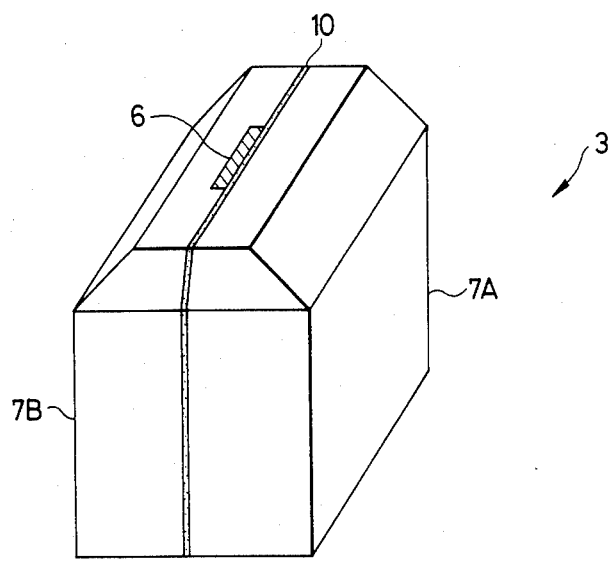
FIG. 11 is a schematic view showing an embodiment in which the thin layer is embedded in a recess made in a nonmagnetic member of the supporter to reduce the thickness of an adhesive layer adjacent to the thin layer.

FIG. 11 shows another embodiment which does not suffer from such problems caused by the presence of the adhesive layer 10. In this embodiment, the magnetic thin layer 6 is received in a recess made in the inner surface of one of the nonmagnetic members 7A or 7B. The thin layer 6 is embedded in the recess so that the inner surface of the nonmagnetic member 7A is flush with the surface of the embedded thin layer 6. Therefore, the right and left halves of nonmagnetic members 7A and 7B of the supporter 7 can be attached to each other with a very small separation distance which is defined by the thickness of the adhesive layer 10 therebetween. Thus, the distance between the right and left nonmagnetic members 7A and 7B can be reduced to 0.2 to 0.5 micrometers which corresponds to one tenth of that of FIG. 9. Since the adhesive layer 10 is very thin with the structure of FIG. 11, the above-mentioned undesirable problems hardly occur when machining and polishing the contact surface of the main magnetic pole 3. Furthermore, the main magnetic pole of FIG. 11 can be used for a long time because the exposed end of the adhesive layer is difficult to wear so that the inner edges of the nonmagnetic members 7A and 7B are prevented from being exposed.

Figure 12:
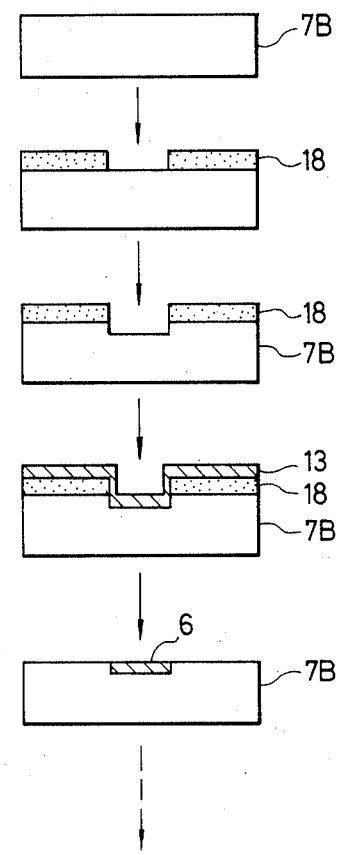
FIG. 12 is a schematic view showing the manufacturing process of the main magnetic pole of FIG. 11.

FIG. 12 shows the manufacturing process of the main magnetic pole 3 of FIG. 11. At first, s photoresist layer 18 is placed on the surface, i.e the above-mentioned inner surface, of one nonmagnetic member 7B to form a mask thereon in accordance with well known photolithographic techniques or printing techniques. Then the exposed surface of the nonmagnetic member 7B is etched to a depth which is equal to the thickness of the magnetic thin layer 6 which will be formed therein later. Either of wet or dry etching technique may be used. After a given recess is made by etching, a thin layer of high permeability substance is formed on the recess and on the photoresist layer 18. This is effected by sputtering or vapor deposition. Then the photoresist layer 18 as well as the thin layer 13 on the photoresist layer 18 is removed to complete the nonmagnetic member 7B having the thin layer 6 embedded therein. Finally, the other nonmagnetic member 7A is attached by an adhesive 10. The assembled main magnetic pole 3 is then machined to have a desired shape as shown in FIG. 11, and the front contact surface thereof is polished to provide a mirror finished surface.

Figure 13:
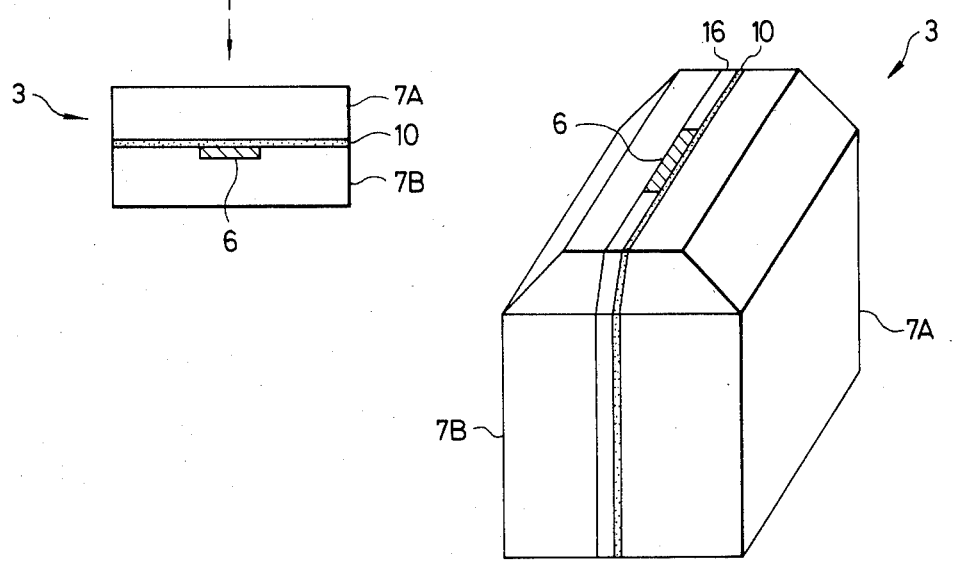
FIG. 13 is a schematic view showing an embodiment in which a nonmagnetic layer is formed beside the thin layer to reduce the thickness of an adhesive layer adjacent to the thin layer.

FIG. 13 shows a modification of the above-described embodiment. Namely, the main magnetic pole 3 of FIG. 13 differs from that of FIG. 11 in that no recess is made in the nonmagnetic member 7A or 7B but a nonmagnetic layer 16 is formed beside the thin layer 6 so that the thickness of the adhesive layer 10 is small in the same manner as in FIG. 11. In detail, the thin layer 6 is formed on the inner side surface of the nonmagnetic member 7A first, and then the nonmagnetic layer 16 having the same thickness as that of the thin layer 6 is formed on the inner side surface which is uncovered by the thin layer 6. The nonmagnetic layer 16 is formed by depositing a nonmagnetic material having a hardness which is equal to or close to the hardness of the nonmagnetic members 7A and 7B of the supporter 7. As such a nonmagnetic material any one of titanium carbide-alumina ($TiC-Al_2O_3$), silicon dioxide ($SiO_2$), alumina ($Al_2O_3$), boron nitride (BN), silicon carbide (SiC), titanium carbide (TiC), magnesia (MgO), titanium dioxide (TiO$_2$), chromium oxide (Cr$_2$O$_3$), chromium dioxide (CrO$_2$), zirconium oxide (ZrO$_2$), barium titanate (BaTiO$_3$), tangsten carbide (WC), and silicon nitride (Si$_3$N$_4$) may be used. The main magnetic pole 3 of FIG. 13 has the same advantage as that of FIG. 11 because the thickness of the adhesive layer 10 is very small.

As described at the beginning of this specification, when more than one parallel track is formed on the recording medium 1 by means of a plurality of heads or by moving a single head in a direction normal to the movement of the recording medium 1, a problem of crosstalk between adjacent tracks occurs.

Figure 14:
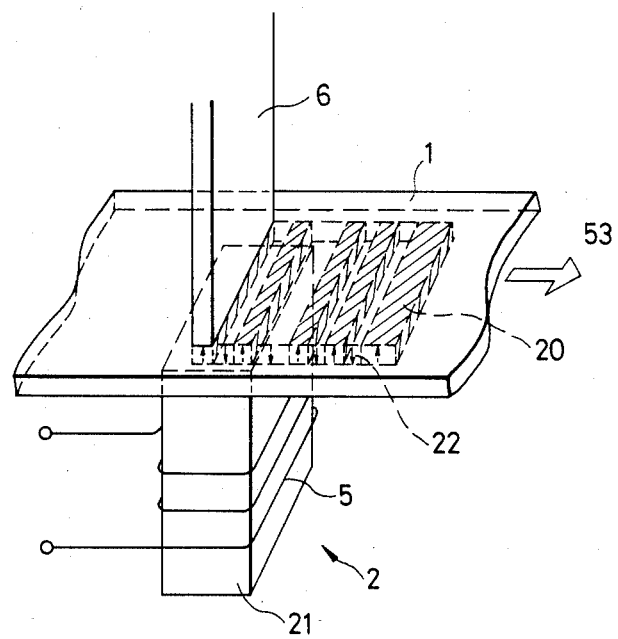
FIG. 14 is a schematic view showing the manner of recording by way of perpendicular magnetization.

FIG. 14 is a schematic diagram showing a recording state of a single track on the recording medium 1. The supporter 7 of the main magnetic pole 3 is not illustrated for simplicity. Hatched portions 20 are magnetized areas whose magnetizing directions are common as indicated by upward arrows, while unhatched portions 22 between any two consecutive hatched portions 20 are also magnetized areas whose magnetizing directions are common but are opposite to that of the hatched portions 20 (see downward arrows).

Figure 15:
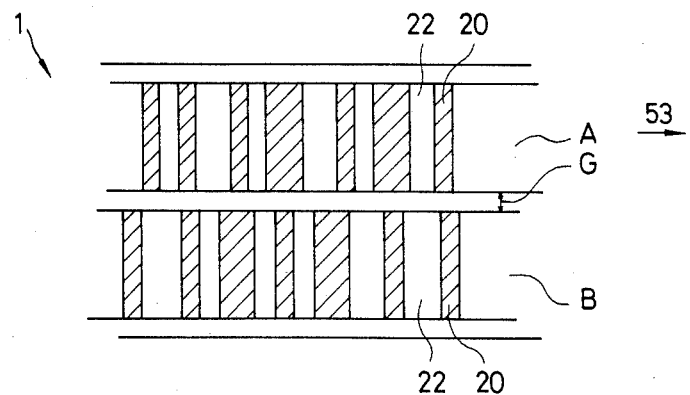
FIG. 15 is a schematic view showing a recording state on a recording medium.

FIG. 15 shows a recording state on the recording medium 1, showing that two parallel track A and B are formed. The reference G indicates a guard band provided between the adjacent tracks A and B so that crosstalk therebetween is prevented. Undesirable crosstalk is primarily caused by leakage flux from adjacent track, and secondarily, by inaccurate positioning of the head. To prevent such undesirable crosstalk in the conventional recording/reproducing systems of perpendicular magnetization type, the width of the guard band G is made broad or one or more erase heads are additionally employed to erase partially magnetized portion on a prerecorded track. In a multi-track recording system, however, presence of such guard bands between adjacent tracks is an obstacle to the achievement of high density recording. Furthermore, the use of one or more erase heads requires an erasing current source, which causes the increase in cost in turn.

Figure 16:
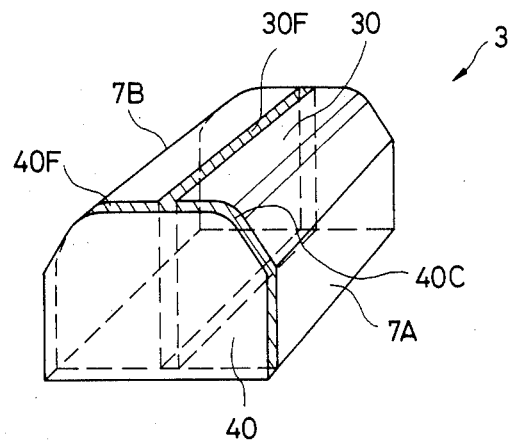
FIG. 16 is a schematic view of an embodiment in which an additional thin layer of high permeability is provided in a direction normal to the original thin layer.

FIG. 16 shows an embodiment of the main magnetic pole 3 of the perpendicular magnetization head 3 with which the above-described various problems relating to crosstalk are removed, while the efficiency of the head has been increased. The main magnetic pole 3 of FIG. 16 comprises a pair of nonmagnetic members 7A and 7B which substantially correspond to those of previous embodiments, a first thin magnetic layer 30 which substantially corresponds to the thin layer 6 of FIG. 1, and a second thin magnetic layer 40 newly provided in this embodiment. The first and second thin layers 30 and 40 are made of a high permeability material in the same manner as in previous embodiments. In detail, the first thin layer 30 is interposed between the pair of nonmagnetic members 7A and 7B of the supporter 7, while the second thin layer 40 having a thickness of 1 to 100 micrometers is attached to one ends of the pair of nonmagnetic members 7A and 7B in such a manner that the second thin layer 40 is normal to the first thin layer 30. Both the first and second thin layers 30 and 40 have their front ends 30F and 40F which are arranged to be in contact with the recording medium 1 in use. The front surface of the main magnetic pole 3 of FIG. 16 is polished so that the contact surface is a mirror finished surface.

The front end 30F of the first thin layer 30 extends in a direction normal to the direction of the movement of the recording medium 1, and has a length corresponding to the width of a single track to be made thereby. The front end 40F of the second thin layer 40 extends in a direction parallel to the direction of the movement of the recording medium 40, and has a length which is ten or more times greater than the width of the first thin layer 30. The front end or edge 40F of the second thin layer 40 extends linearly and then is curved at both ends thereof. The curved portions, which are designated at the reference 40C, are referred to as rounded portions, and the pair of nonmagnetic members 7A and 7B respectively have similar curved portions at their shoulders. When the main magnetic pole 3 is in contact with the recording medium 1 as shown in FIG. 1, the front surface including the front end 30F of the first thin layer 30 and the front end 40F of the second thin layer 40 is in contact with the recording medium 1, while the rounded portions 40C of the second thin layer 40 are partly in contact with the recording medium 1. In other words, the rounded portions 40 are portions where the recording medium 1 comes into contact with one end of the front end 40F of the second thin layer 40 and leaves from the other end of the same.

Figure 17:
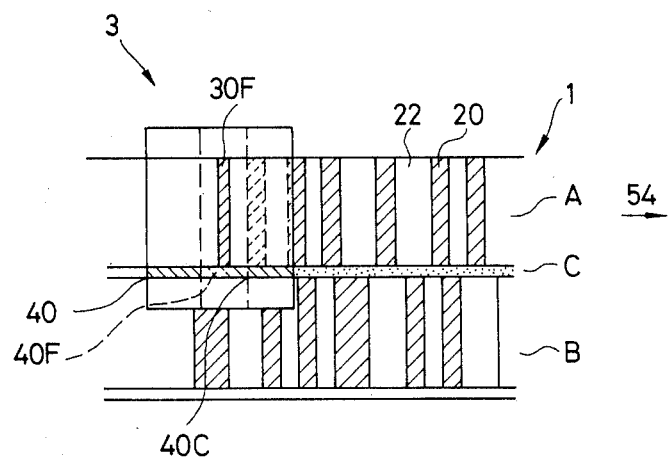
FIG. 17 is a schematic view for the explanation of the operation of the head of FIG. 16.

The magnetic head having the main magnetic pole 3 of FIG. 16 operates as follows. FIG. 17 is a schematic diagram showing the relationship between the first and second layers 30 and 40 of the main magnetic pole 3 of FIG. 16 and the magnetized areas on the recording medium 1 which is arranged to travel in a direction indicated by an arrow 54. In the illustrated example, digital data is shown to be prerecorded on a track B, while the head is writing another digital data on an adjacent track A. The hatched and unhatched portions 20 and 22 respectively correspond to those of FIG. 15 and represent logic "1" and "0" respectively. Namely, these magnetized portions 20 and 22 are formed by the front end 30F of the first thin layer 30. Another track C is formed between the tracks A and B by the front end 40F of the second thin layer 40.

Paying attention to the operation of the second layer 40 of the main magnetic pole 3, a portion on the track C which is in contact with the front end 40F of the second thin layer 40, is magnetized primarily in the same manner as the track A in accordance with logic "1" or "0" signal applied to the record coil 4 of the sub magnetic pole 2 (see FIG. 1). However, because of the provision of the rounded portions 40C, residual magnetism which remains on the recording medium 1 is determined by the magnetizing force applied from one of the rounded portions 40C from which the recording medium 1 leaves. In other words, substantial writing is effected by a small area of the rounded portion 40C at the right in FIG. 17 because the recording medium 1 moves from the left to the right.

Since the rounded portion 40C goes away gradually from a given point on the recording medium 1 as the recording medium 1 travels, the boundary between consecutive magnetized portions of logic "1" and "0" on the track C does not necessarily have a linear edge which is seen in the magnetized portions 20 and 22 of the track A. That is to say, the boundary is apt to be curved and inclined so that each boundary is not parallel to adjacent boundary. As a result, the effective length of the magnetized portion measured along the direction of the movement of the recording medium 1 does not have a distinct relationship with the wavelength of the signal applied to the record coil 4 although the length of each of the magnetized portions 20 and 22 is usually an integral multiple of the half-wavelength.

Moreover, with the provision of the rounded portion 40C, logic "1s" and "0s" are repeatedly superimposed on the same portions of the recording medium 1. Therefore, residual magnetism on corresponding magnetized portions is of low level. In other words, the track C is weakly or slightly magnetized by the second thin layer 40.

The recorded or written data is read out or reproduced as follows. The data of the magnetized portions 20 and 22 is scanned and picked up by the front end 30F of the first layer 30 in the same manner as in the conventional head. On the other hand, the weakly magnetized area on the track C is scanned by the second thin layer 40 as follows. It is to be noted here that the length of the front end 40F of the second thin layer 40, which front end 40F is in contact with the recording medium 1, is much greater than the width of the front end 30F of the first thin layer 30 as described hereinabove so a number of logic 1s and 0s are simultaneously scanned. Accordingly, logic "1" and "0" information pieces, which have been weakly written in the track C in the above-mentioned manner, are offset or cancelled with each other so that no signal can be derived through the front end 40F of the second thin layer 40. Thus, the signal which can be derived from the track C through the second thin layer 40 corresponds to the sum of information picked up by one rounded portion 40C and information picked up by the other rounded portion 40C, where the recording medium 1 comes into contact at one of the rounded portions 40C and goes away from the other rounded portion 40C. Although the sum output increases and decreases in accordance with the information signals at the rounded portions 40C, its amplitude is negligibly small inasmch as the rounded portions 40C repeatedly simultaneously reproduce logic "1s" and "0s" in the same manner as in writing so that logic "1s" and "0s" negate each other. As a result, very low amplitude signal can be derived through the second thin layer 40. For this reason, no effective signal can be picked up by the second thin layer 40, while the first thin layer functions in the same manner as in conventional heads. Thus, the output signal derived from the head is substantially determined by the information picked up by the first thin layer 30.

In a preferred embodiment shown in FIG. 16, the width of the second thin layer 40 which corresponds to the width of the track C is much smaller (1/several tens—1/several hundreds) than the length of the front end 30F of the first thin layer 30 which corresponds to the width of the track A (330 micrometers for instance). This also causes the amplitude of a signal picked up by the second thin layer 40 to be much smaller than that from the first thin layer 30.

Summarizing the operation of the second thin layer 40 of the main magnetic pole 3, the flux passing through the second thin layer 40 hardly affects the reproduced output signal of the main magnetic pole 3. Namely, the second thin layer 40 functions as an extremely-low-sensitivity head. This fact is advantageous when the main magnetic pole 3 is offtrack.

Suppose that the main magnetic pole 3 is inaccurately positioned so that the front end 40F of the second thin layer 40 projects beyond the track C to be on the track B, the second thin layer 40 does not pick up information from the track B. Therefore, the signal prerecorded on the track B does not interfere with the signal from the track A derived by the the first thin layer 30. On the contrary, assuming that the front end 40F of the second thin layer 40 is positioned on the track A due to inaccurate positioning, only the information of the track A is derived by the head although the signal amplitude is slightly decreased because the effective track width for reproduction is slightly shorter than the actual width of the track width.

From the above it will be understood that the second thin layer 40 does not pick up information from tracks A, B and C. The track C can be regarded as a kind of a guard band because no distinct information can be derived therefrom, and therefore, the track C can be treated as an insensitive band or dead zone. Moreover, since the second thin layer 40 does not pick up information effectively, the second thin layer 40 can be regarded as an insensitive head. Accordingly, it can be regarded as if the insensitive or dead zo e on the recording medium 1 were twice the width of the insensitive track C.

As is well known, the width of each magnetized area each corresponding to logic "1" or "0" is very small, while a transient portion, i.e. the above-mentioned boundary, between two consecutive magnetized portions of logic "1" and "0" is a few times smaller than the thickness of the recording medium 1. This means that a portion undesirably magnetized by leakage flux from the main magnetic pole 3 is very small, and therefore, undesirable influence due to crosstalk is not given when the width of the dead zone between adjacent tracks A and B is twice the thickness of the second thin layer 40.

Figure 18A:
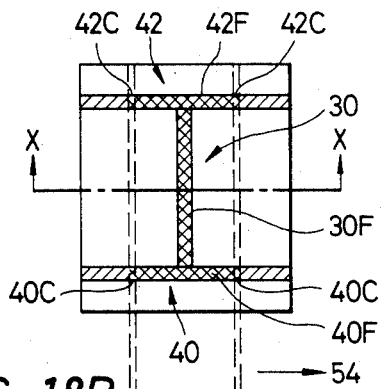
FIGS. 18A and 18B show a modification of the embodiment of FIG. 16.
Figure 18B:
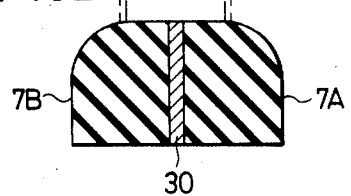
Figure 19A:
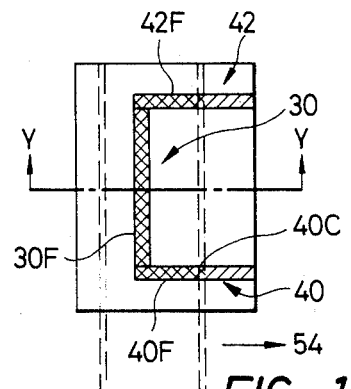
FIGS. 19A and 19B show another modification of the embodiment of FIG. 16.
Figure 19B:
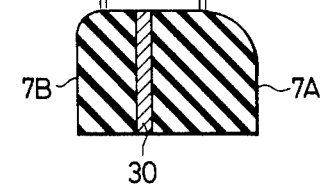

FIGS. 18A, 18B and 19A, 19B show respectively modifications of the above-described embodiment of the present invention. FIGS. 18A and 19A are schematic plan views, and FIGS. 18A and 19B are cross-sectional views respectively taken along the lines X—X and Y—Y of FIGS. 18A and 19A. In a main magnetic pole 3 of FIGS. 18A and 18B, an additional thin layer 42 is provided so that the additional thin layer 42 is parallel to the second layer 40 in such a manner that the front end 30F of the first thin layer 30 is interposed between these two parallel thin layers 40 and 42. The additional thin layer 42, which may be referred to as a third thin layer, is substantially the same as the second thin layer 40 so that the above-mentioned dead zone is provided at the both sides of the track scanned by the head.

Another modification of FIGS. 19A and 19B is different from that of FIGS. 18A and 18B in that the second and third layers 40 and 42 extend from the front end 30F in one direction parallel to the direction of the movement of the recording medium 1 (see arrows 54 in FIGS. 18A and 19A, showing the direction of the recording medium 1 movement). In other words, the first, second and third thin layers 30, 40 and 42 constitute a U-shape.

In both FIGS. 18A and 19A, the reference numerals 42F and 42C indicate respectively the front end and the rounded portion of the third thin layer 42. These embodiments of FIGS. 18A to 19B are useful when more than two tracks are to be formed on the recording medium 1 because the third thin layer 42 functions in the same manner as the second thin layer 40, providing a dead zone.

In the above, although the head is used to both write and read data or information, the head having the main magnetic pole 3 of any one of FIGS. 16, 18A and 19A, may be used for only reading or reproducing because the second thin layer 40 and the third thin layer 42 function as insensitive heads.

The head employing the main magnetic pole 3 of any one of FIGS. 16, 18A and 19A has not only the above-described advantage of reducing crosstalk but also has an advantage of increasing the reproducing efficiency or sensitivity. As is well known reluctance of a magnetic circuit changes as a function of cross-section of a magnetic path. With the provision of the second thin layer 40 or the second and third thin layers 40 and 42, the cross-section of the magnetic path within the main magnetic pole increases compared to a main magnetic pole having only the first thin layer 30. As is understood from FIG. 14 the magnetic substance within the main magnetic pole 3 is magnetized by the magnetic field from the magnetized area 20 when reading the data from the recording medium 1. The flux passing through the main magnetic pole 3 is directed from the front end of the thin layer 6, which corresponds to the first thin layer 30, to the opposite end, and further goes into the atmosphere to return to the rear end of the sub magnetic pole 2. Thus, the flux in the sub magnetic pole 2 is emitted from its front end to return to the magnetized area 20 or 22. Reduction in reluctance, therefore, results in increase in the flux passing through the magnetic substance of the main magnetic pole 3. Although, the second and third thin layers 40 and 42 do not contribute to reproduction or picking up operation, the flux passing through the first thin layer 30 increases especially at a portion adjacent to the second and third layers 40 and 42. For this reason, the amplitude of the reproduced signal is higher than in a conventional magnetic head.

Figure 20:
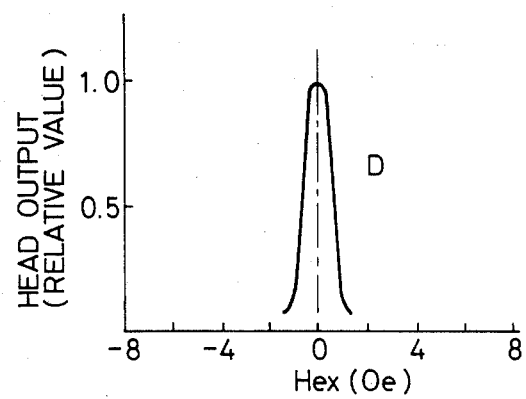
FIG. 20 is a graph showing undesirable influence due to an external magnetic field.

Prior to describing another emobodiment of the present invention, which is useful for removing undesirable influence caused by external magnetism, the undesirable influence from which conventional heads suffer will be described. FIG. 20 is a graph showing the results of experiments of influence by an external magnetic field. An external magnetic field intensity is expressed in terms of Hex and varies from a negative value to a positive value along the X axis, while the signal output from a magnetic head having a high permeability magnetic thin layer is shown along the Y axis (the signal output is plotted by its relative value). From the characteristic curve D of FIG. 20, it will be understood that the amplitude of the head lowers from the maximum when used in an external magnetic field of 0.5 Oe or so. Such a low intensity magnetic field may be readily applied from terrestrial magnetism or various parts and devices around the head.

Figure 21:
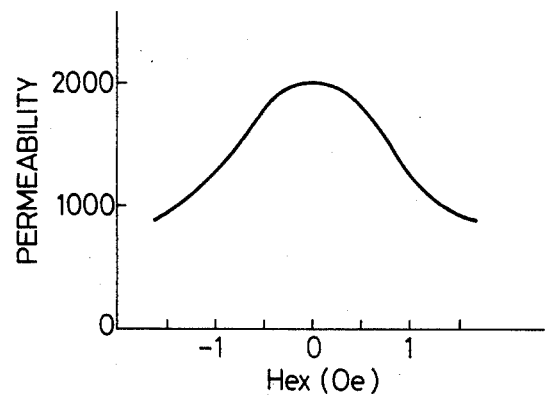
FIG. 21 is a graph showing the variation in permeability of the thin layer of the main magnetic pole.

FIG. 21 is a graph showing the variation in permeability of a typical high permeability thin layer made of permalloy and having a thickness of 0.7 micrometers with respect to an external magnetic field Hex. As shown in the graph of FIG. 21, the permeability of the thin layer lowers when affected by an external magnetic field of 1 Oe or so. The decrease in permeability as shown in FIG. 21 is caused by magnetic saturation of the thin layer of high permeability, and the decrease in permeability results in the decrease in the output amplitude of the head as shown in FIG. 20. Generally speaking, such decrease in permeability can be seen in other high permeability substances, such as Sendust, amorphous materials, ferrite or the like.

Figure 22:
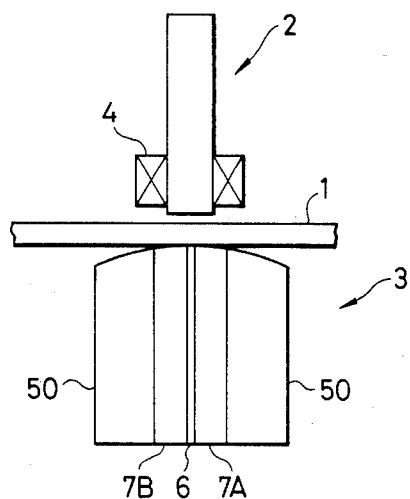
FIG. 22 is a schematic view showing an embodiment having two magnetic blocks functioning as a magnetic shielding member.

FIG. 22 shows an embodiment of the present invention, with which the above-described undesirable influence due to an external magnetic field is reduced. The embodiment of FIG. 22 differs substantially from the previous embodiments in that a pair of magnetic blocks 50 made of high permeability is attached to the both sides of the nonmagnetic supporter 7 which holds the magnetic thin layer 6. In detail, the magnetic blocks 50 are preferably made of ferrite, Fe-Ni alloy, or Sendust or the like.

Figure 23:
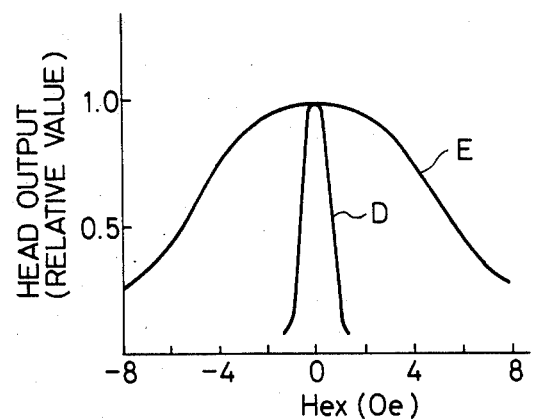
FIG. 23 is a graph showing the effect of magnetic shielding achieved by the embodiment of FIG. 22.

FIG. 23 is a graph showing the difference in output signal level between a conventional head having no high permeability blocks at both sides of the supporter 7 and the head of FIG. 22. A curve D is the same as that in FIG. 20, and another curve E shows the output characteristic of the head illustrated in FIG. 22. From the comparison between the curves D and E, it will be understood that the output level of the head of FIG. 22 does not lower from its maximum even if an external magnetic field is applied having an intensity six times greater than the intensity at which the output level from the conventional head lowers. The above-mentioned output signal characteristic of curve E of FIG. 23 is obtained because of the provision of the high permeability blocks 50. Describing this point further, it is to be noted that the reluctance of the high permeability blocks is very low, and therefore, most of the flux of an external magnetic field passes through these blocks 50. This means that the blocks 50 provide by-pass channels for the flux of the external magnetic field. As a result, the amount of flux passing through the high permeability thin layer 6 is much smaller than in the coventional main magnetic pole, and accordingly, the permeability of the thin layer 6 is difficult to decrease when the head is used in an external magnetic field Hex. In other words, the blocks 50 function as a magnetically shielding member so that the thin layer is not substantially affected by an external magnetic field Hex.

In the embodiment of FIG. 22, although two pieces or blocks 50 of high permeability are provided in such a manner that the supporter 7 is interposed therebetween, one of the block 50 may be omitted if desired. When only one high permeability block 50 is provided, a similar effect of by-passing the flux of an external magnetic field is obtained. In addition, one or two of the blocks 50 are not necessarily attached to the sides of the supporter 7. Namely, the block or blocks 50 may be positioned in the vicinity of the main magnetic pole 3 so that the block(s) 50 functions as a by-pass.

As shown in FIG. 22, the high permeability blocks 50 are spaced apart from the center thin layer 6, and are magnetically insulated from the thin layer 6. Furthermore, the blocks 50 are arranged not to be in contact with the recording medium 1 so that the blocks 50 are prevented from functioning in the same manner as the thin layer 6. In other words, the blocks 50 are positioned so that magnetic flux applied thereto from the sub magnetic pole 2 or from the recording medium 1 is of low density resulting in no effective writing or reading with the blocks 50.

If the blocks 50 were connected to the thin layer 6 to be strongly magnetically coupled therewith, some flux of an external magnetic field passing through the blocks 50 would enter into the thin layer 6. As a result, the amount of an external magnetic field flux passing through the thin layer 6 increases. For this reason, it is preferable that the blocks 50 are magnetically insulated from the thin layer 6.

Figure 24:
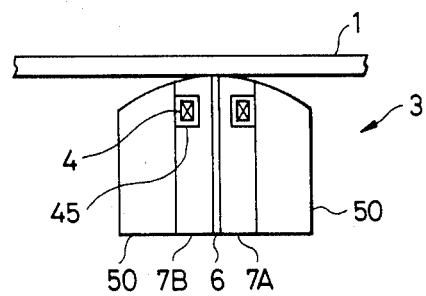
FIG. 24 is a schematic view showing a modification of the embodiment of FIG. 22.

FIG. 24 is a modification of the above-described embodiment of FIG. 22. This embodiment is directed to a main magnetic pole excitation type head. The main magnetic pole 3 is equipped with one or more coils 4 wound around the supporter 7 in which the thin layer 6 is held. The coil 4 is shown to be embedded in a recess 45 which encircles the supporter having right and left halves 7A and 7B. Two blocks 50 which are substantially the same as those in FIG. 22 are respectively attached to the both sides of the supporter 7 so that the blocks 50 function as by-pass for an external magnetic field Hex, and thus as a magnetically shielding member. In this embodiment, moreover, since the coil or coils 4 are magnetically shielded by the blocks 50, the coil(s) 4 is/are not affected by an external magnetic field which may result in occurrence of noises.

The above-described embodiments are just examples of the present invention, and therefore, it will be apparent for those skilled in the art that many modifications and variations may be made without departing from the spirit of the present invention.

What is claimed is:

1. In an magnetic head of perpendicular magnetization type for use with a magnetic recording medium having a layer made of Co-Cr, the improvement comprising:
   (a) a main magnetic pole having a thin layer made of a high permeability magnetic material, and a non-magnetic supporter for holding said thin layer, said thin layer and said supporter providing a contact surface arranged to be in contact with the recording medium, at least the contact surface of said supporter being made of a polycrystalline sintered body substantially composed of titanium carbide (TiC) and alumina ($Al_2O_3$);
   (b) a sub magnetic pole having a core arranged to face said main magnetic pole to constitute a magnetic circuit therewith so that said recording medium travels between said main and sub magnetic poles;
   (c) at least one coil arranged to excite one of said main and sub magnetic poles, and
   (d) a second thin layer made of a high permeability magnetic material, said second thin layer being normal to the first mentioned thin layer and attached to one end of said first mentioned thin layer so as to form a T-shaped magnetic contact surface.

2. An improved magnetic head as claimed in claim 1, wherein said second thin layer comprises a flat front end arranged to be in contact with said recording medium, and at least one rounded portion at one end of said flat front end.

3. An improved magnetic head as claimed in claim 2, wherein said flat front end has a length which is ten or more times greater than the width of said first mentioned thin layer.

4. An improved magnetic head as claimed in claim 1, wherein said first mentioned thin layer has a thickness of 0.1 to 3 micrometers and said second thin layer has a thickness of 1 to 100 micrometers.

5. An improved magnetic head as claimed in claim 1, wherein said second thin layer extends in both directions from said end of said first mentioned thin layer.

6. An improved magnetic head as claimed in claim 1, further comprising a third thin layer made of a high permeability magnetic material, said third thin layer being normal to the first mentioned thin layer and attached to the other end of said first mentioned thin layer.

7. An improved magnetic head as claimed in claim 6, wherein said third thin layer comprises a flat front end arranged to be in contact with said recording medium, and at least one rounded portion at one end of said flat front end.

8. An improved magnetic head as claimed in claim 6, wherein said flat front end of said third thin layer has a length which is ten or more times greater than the width of said first mentioned thin layer.

9. An improved magnetic head as claimed in claim 6, wherein said first mentioned thin layer has a thickness of 0.1 to 3 micrometers and said third thin layer has a thickness of 1 to 100 micrometers.

10. An improved magnetic head as claimed in claim 6, wherein said third thin layer extends in both directions from said other end of said first mentioned thin layer.

11. An improved magnetic head as claimed in claim 6, wherein said second and third thin layers extend in one direction from said both ends of said first mentioned thin layer so that said front ends of said first, second and third thin layers form a U-shape.

* * * * *